US007733365B2

(12) United States Patent
Chee et al.

(10) Patent No.: US 7,733,365 B2
(45) Date of Patent: Jun. 8, 2010

(54) IMAGING APPARATUS HAVING PRINT ENGINE THAT INCLUDES MEMS DEVICE

(75) Inventors: Christopher Gregory Chee, Lexington, KY (US); Martin Christopher Klement, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 369 days.

(21) Appl. No.: 11/950,981

(22) Filed: Dec. 5, 2007

(65) Prior Publication Data

US 2008/0074720 A1 Mar. 27, 2008

Related U.S. Application Data

(62) Division of application No. 10/950,071, filed on Sep. 24, 2004, now Pat. No. 7,350,758.

(51) Int. Cl.
*B41J 15/14* (2006.01)
*G02B 26/08* (2006.01)
*G02F 1/09* (2006.01)

(52) U.S. Cl. ..................... 347/242; 359/198.1; 359/280

(58) Field of Classification Search ................. 347/242; 359/198.1, 280

See application file for complete search history.

(56) References Cited

U.S. PATENT DOCUMENTS 4,037,231 A * 7/1977 Broyles et al. .............. 347/246
5,969,465 A 10/1999 Neukermans et al.
6,541,831 B2 4/2003 Lee et al.
6,616,046 B1 9/2003 Barkan et al.
6,657,765 B2 12/2003 Hayashi et al.
6,692,107 B2 2/2004 Lattuca et al.
6,838,661 B2 1/2005 Klement
2001/0022682 A1* 9/2001 McClelland et al. ........ 359/280
2002/0122217 A1* 9/2002 Nakajima .................. 358/505
2002/0141085 A1 10/2002 Whitehead et al.
2004/0119810 A1* 6/2004 Cannon et al. .............. 347/233
2006/0152106 A1 7/2006 Yan et al.

* cited by examiner

*Primary Examiner*—Stephen Meier
*Assistant Examiner*—Sarah Al-Hashimi

(57) ABSTRACT

An imaging apparatus includes a controller executing instructions to form a latent image, and a print engine. The print engine includes a laser source, a micro-electromechanical system (MEMS) device, and a module for mounting the MEMS device. The print engine is communicatively coupled to the controller and configured to form the latent image using the laser source and the MEMS device. The module includes a base having a first support and a second support, the second support having a support guide feature; and a bracket attached to the MEMS device. The bracket has a central axis, a first end, and a second end, the second end having a bracket guide feature, the first end being affixed to the first support to form a cantilever arrangement. The support guide feature engages the bracket guide feature to form a sliding joint having a sliding axis substantially parallel to the central axis.

16 Claims, 6 Drawing Sheets

IMAGING APPARATUS HAVING PRINT ENGINE THAT INCLUDES MEMS DEVICE

CROSS REFERENCE TO RELATED APPLICATIONS

This is a division of U.S. patent application Ser. No. 10/950,071, entitled "MODULE FOR MOUNTING A MEMS DEVICE", filed Sep. 24, 2004 now U.S. Pat. No. 7,350,758.

BACKGROUND OF THE INVENTION

1. Field of the Invention

The present invention relates generally to electrophotographic printing devices and, more particularly, to a module for mounting a MEMS device in the form of a torsion oscillator for use in electrophotographic printing devices.

2. Description of the Related Art

In the electrophotographic imaging process used in printers, copiers and the like, a photosensitive member, such as a photoconductive drum or belt, is uniformly charged over an outer surface. An electrostatic latent image is formed by selectively exposing the uniformly charged surface of the photosensitive member to at least one beam of light from a laser scanning unit. Toner particles are applied to the electrostatic latent image, and thereafter the toner image is transferred to the media intended to receive the final permanent image. The toner image is fixed to the media by the application of heat and pressure in a fuser.

In the past, laser scanning units employed a rotating polygonal mirror to scan the laser beam across the photosensitive member. However, in modern laser scanning units, a micro-electromechanical system (MEMS) in the form of a torsion oscillator may replace the polygonal mirror. Potential advantages of the torsion oscillator system over conventional rotating polygonal mirrors include higher scanning speeds, reduced size and weight, lower cost, and higher reliability. However, wide use of the torsion oscillator in scanning systems has been hampered by various problems, including the lack of robust mounting configurations for MEMS devices that have prevented the potential benefits of MEMS technology from being fully realized.

What is needed in the art is an improved module for mounting a MEMS device.

SUMMARY OF THE INVENTION

The present invention provides an improved module for mounting a MEMS device.

The invention, in one form thereof, relates to a module for mounting a micro-electromechanical system (MEMS) device. The module includes a base having a first support and a second support. The second support has a support guide feature. The module also includes a bracket attached to the MEMS device, the bracket having a central axis, a first end, and a second end. The second end has a bracket guide feature. The first end is affixed to the first support of the base to form a cantilever arrangement. The support guide feature engages the bracket guide feature to form a sliding joint having a sliding axis substantially parallel to the central axis.

The invention, in another form thereof, relates to a method of mounting a micro-electromechanical system (MEMS) device to a base. The method includes attaching the MEMS device to a bracket having a first end and a second end corresponding to a first support and a second support of the base, respectively; positioning the second end of the bracket in a Y-axis direction relative to the second support of the base; simultaneously positioning the first end of the bracket in both the Y-axis direction and an X-axis direction orthogonal to the Y-axis direction relative to the first support of said base; positioning the first end of the bracket in a Z-axis direction orthogonal to both the X-axis direction and the Y-axis direction relative to the base, wherein the second end of the bracket is spaced apart from the second support in the Z-axis direction thereby cantilevering the bracket; and securing the first end of the bracket to the first support of the base.

The invention, in still another form thereof, relates to an imaging apparatus. The imaging apparatus includes a controller executing instructions to form a latent image, and a print engine including a laser source, a micro-electromechanical system (MEMS) device, and a module for mounting the MEMS device. The print engine is communicatively coupled to the controller and configured to form the latent image using the laser source and MEMS device in response to the instructions. The module includes a base having a first support and a second support. The second support has a support guide feature. The module also includes a bracket attached to the MEMS device, the bracket having a central axis, a first end, and a second end. The second end has a bracket guide feature, and the first end is affixed to the first support of the base to form a cantilever arrangement. The support guide feature engages the bracket guide feature to form a sliding joint having a sliding axis substantially parallel to the central axis.

An advantage of the present invention is that the strain induced in a MEMS device due to its mounting is reduced, thereby minimizing adverse effects on the MEMS device.

Another advantage of the present invention is that unintended motion, such as off-axis motion of a torsion oscillator is reduced, thereby reducing distortion in the laser scan.

A further advantage of the present invention is that by reducing off-axis motion of the torsion oscillator, stress on the torsion arms of the torsion oscillator is reduced.

Still another advantage is that the potentially detrimental effects of differential thermal expansion between the MEMS bracket and the corresponding base mounting supports are minimized.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplifications set out herein illustrates an embodiment of the invention, in one form, and such exemplifications are not to be construed as limiting the scope of the invention in any manner.

DETAILED DESCRIPTION OF THE INVENTION

Figure 1:
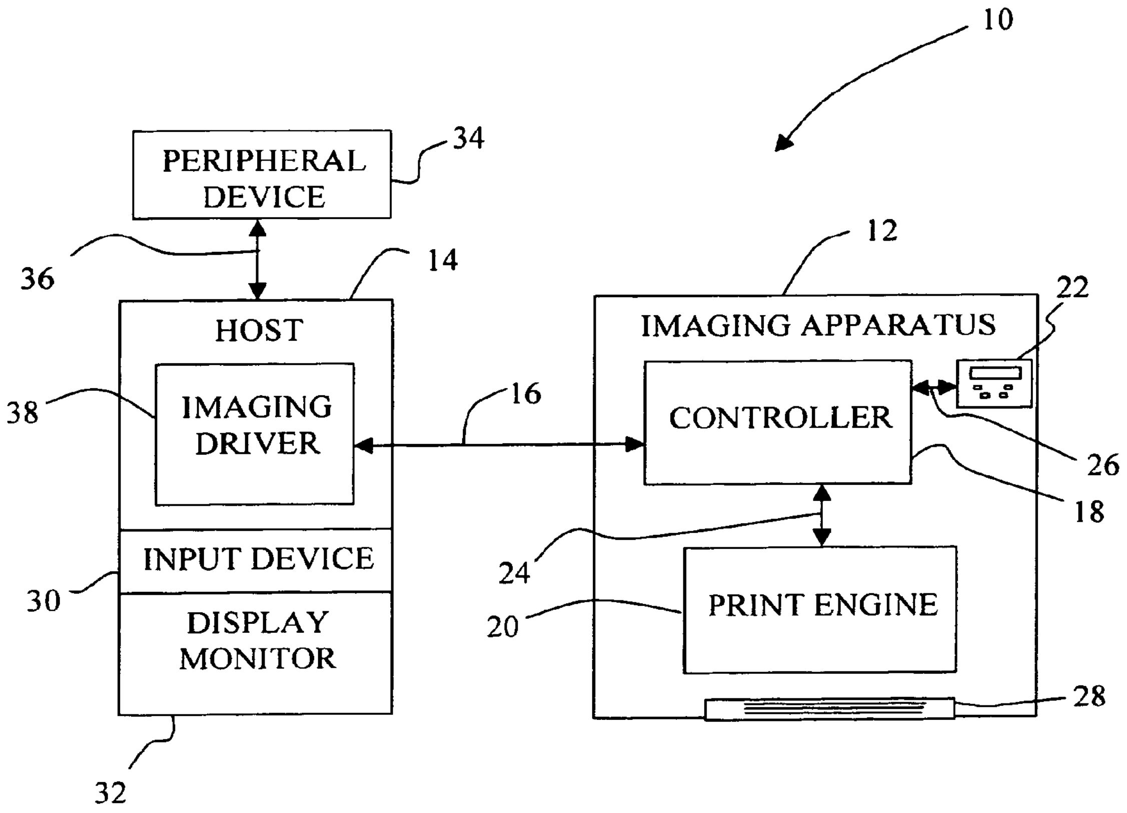
FIG. 1 is an imaging system including an imaging apparatus configured in accordance with the present invention.

Referring now to the drawings, and particularly to FIG. 1, there is shown a diagrammatic depiction of an imaging system 10 embodying the present invention. Imaging system 10 includes an imaging apparatus 12 and a host 14. Imaging apparatus 12 communicates with host 14 via a communications link 16.

Imaging apparatus 12 can be, for example, an electrophotographic printer and/or copier. Imaging apparatus 12 includes a controller 18, a print engine 20 and a user interface 22.

Controller 18 includes a processor unit and associated memory, and may be formed as an Application Specific Integrated Circuit (ASIC). Controller 18 communicates with print engine 20 via a communications link 24. Controller 18 communicates with user interface 22 via a communications link 26.

In the context of the examples for imaging apparatus 12 given above, print engine 20 can be, for example, a color electrophotographic print engine, configured for forming an image on a print medium 28, such as a sheet of paper, transparency or fabric.

Host 14 may be, for example, a personal computer including an input device 30, such as a keyboard, and a display monitor 32. A peripheral device 34, such as a scanner or a digital camera, is coupled to host 14 via a communication link 36. Host 14 further includes a processor, input/output (I/O) interfaces, memory, such as RAM, ROM, NVRAM, and a mass data storage device, such as a hard drive, CD-ROM and/or DVD units. During operation, host 14 includes in its memory a software program including program instructions that function as an imaging driver 38, e.g., printer driver software, for imaging apparatus 12. Imaging driver 38 is in communication with controller 18 of imaging apparatus 12 via communications link 16. Imaging driver 38 facilitates communication between imaging apparatus 12 and host 14, and may provide formatted print data to imaging apparatus 12, and more particularly, to print engine 20. Although imaging driver 38 is described and depicted as residing in host 14, alternatively, it is contemplated that all or a portion of imaging driver 38 may be located in controller 18 of imaging apparatus 12.

Communications link 16 may be established by a direct cable connection, a wireless connection, or by a network connection, such as, for example, an Ethernet local area network (LAN). Communications links 24, 26, and 36 may be established, for example, by using standard electrical cabling or bus structures, or by wireless connection.

Figure 2:
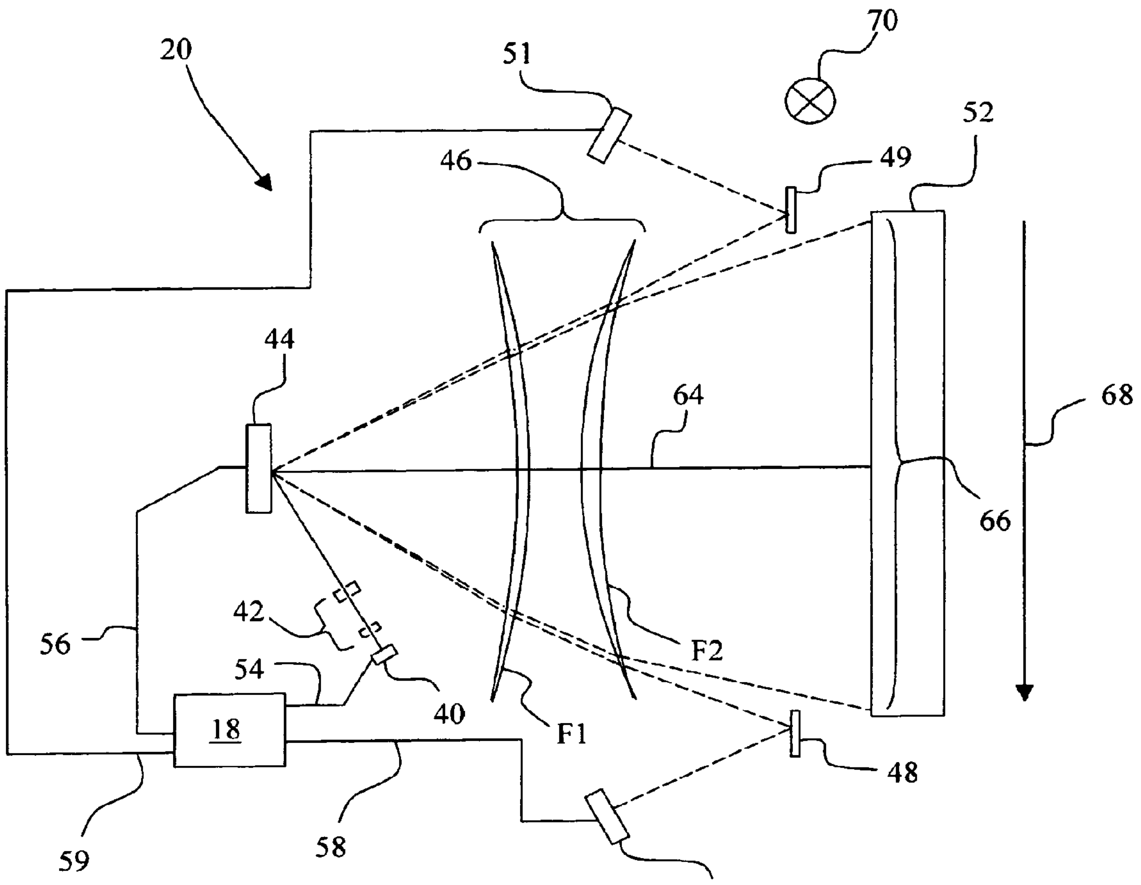
FIG. 2 is a diagrammatic representation of the print engine of FIG. 1, including a scanning unit in accordance with the present invention.

Referring now FIG. 2, there is shown a diagrammatic representation of print engine 20 configured in accordance with the present invention. Print engine 20 includes a laser source 40, such as a laser, a pre-scan optics arrangement 42, a scanning unit 44, an f-theta lens arrangement 46, mirrors 48, 49 light intensity sensors 50, 51 and a photoconductive element 52. Photoconductive element 52 may be, for example, a rotating photoconductive drum of a type well known in the electrophotographic imaging arts, and may be formed as a part of an imaging cartridge that includes a supply of toner.

Print engine 20 is communicatively coupled to controller 18, and is configured to form a latent image on photoconductive element 52 using laser source 40 and scanning unit 44 in response to the instructions executed by controller 18.

Accordingly, controller 18 is communicatively coupled to laser source 40 via a communications link 54. In addition, controller 18 is communicatively coupled to scanning unit 44 via a communication link 56, and is communicatively coupled to light intensity sensors 50, 51 via communications links 58, 59, respectively. Each of communications links 54, 56, and 58 may be, for example, a multi-conductor electrical cable, and are integral to and extending from communications link 24. Controller 18 executes instructions to form a latent image to be developed on a substrate, i.e., print medium 28, for example, by the use of laser source 40, scanning unit 44, and photoconductive element 52 in imaging apparatus 12.

Figure 3:
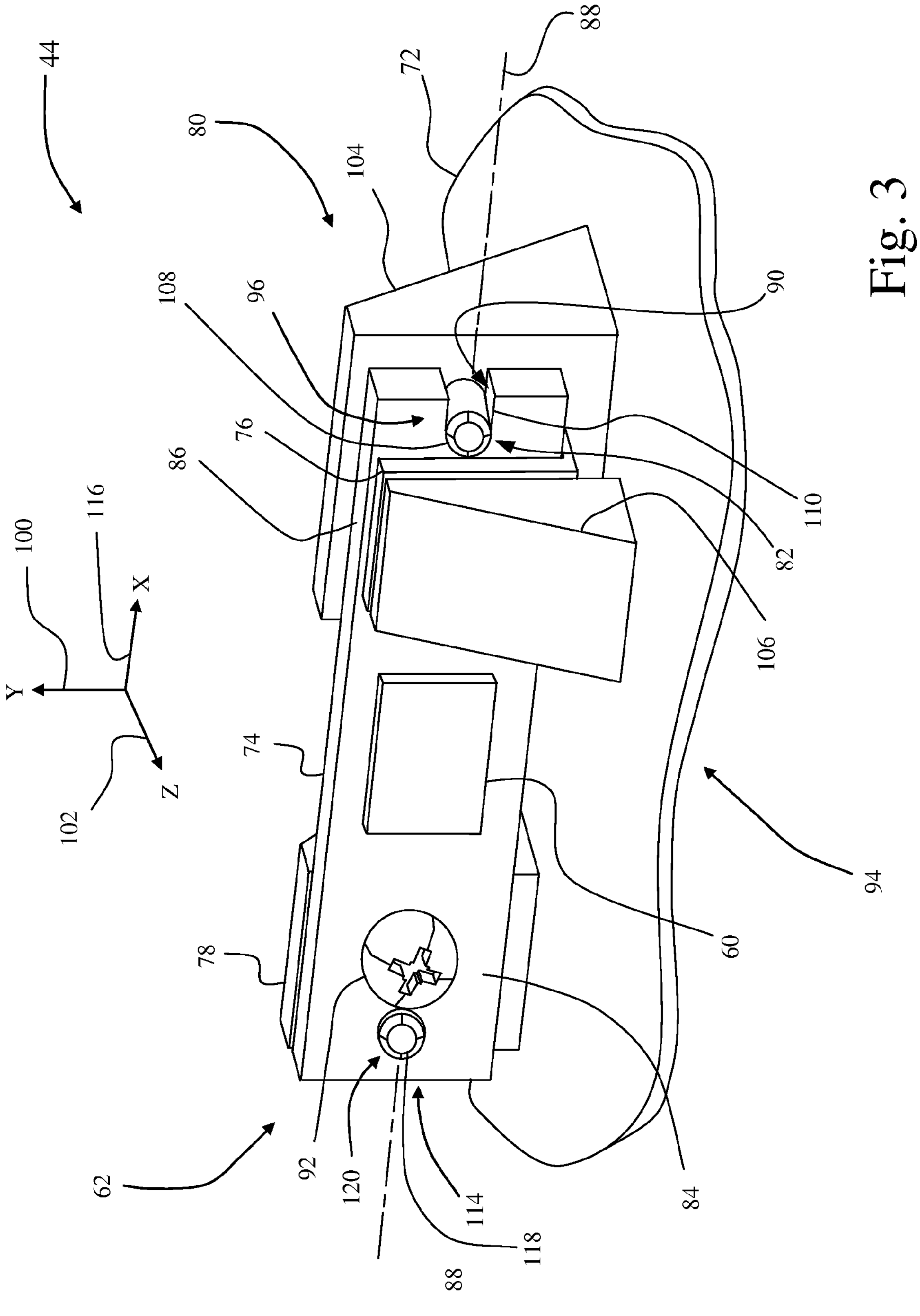
FIG. 3 is a perspective view of a module for mounting a MEMS device in accordance with the present invention.

Referring now to FIG. 3, scanning unit 44 includes a microelectromechanical system (MEMS) device 60 in the form of a torsion oscillator having a mirror surface, and a module 62 for mounting MEMS device 60. The mirror surface may be formed integral with MEMS device 60 or affixed thereto to become a part of MEMS device 60. As a torsion oscillator, MEMS device 60 is configured to rotationally oscillate in order to scan a light beam across photoconductive element 52. Print engine 20 thus forms the latent image using laser source 40 and MEMS device 60 of scanning unit 44 in response to the instructions executed by controller 18

Referring again to FIG. 2, during operation, laser source 40 emits a light beam 64 which is collected and focused by pre-scan optics arrangement 42, which may include a collimation lens, onto the oscillating mirrored surface of MEMS device 60, which in turn scans light beam 64 over the surface of photoconductive element 52. More particularly, controller 18 controls laser source 40 and scanning unit 44 to scan light beam 64 across an image region 66 of photoconductive element 52 over a plurality of scans to form a latent image on photoconductive element 52. F-theta lens arrangement 46, which includes f-theta lenses F1 and F2, is configured to govern the position of light beam 64 in both a scan direction 68 across photoconductive element 52 and in a process direction 70, i.e., a direction perpendicular to scan direction 68. Process direction 70 is depicted in FIG. 2 in the form of an "X" enclosed by a circle, which indicates that process direction 70 is perpendicular to the plane of FIG. 2. Further, f-theta lens arrangement 46 is utilized to magnify the light beam spacing in the process direction 70 to meet the requirements of the particular imaging apparatus 12 application.

In order to coordinate the delivery of image data to laser source 40, light intensity sensors 50, 51 are employed as horizontal synchronization (HSYNC) detectors, which provide an output representing the light received in the form of an HSYNC signal to controller 18, which in turn is used by controller 18 to control the operation of laser source 40 and scanning unit 44. Light intensity sensors 50, 51 may be, for example, photo diodes that are located to intercept light beam 64 outside the desired image region 66. Mirrors 48, 49 are used to deflect light beam 64 out of its path toward photoconductive element 52 and direct it to light intensity sensors 50, 51, which generate HSYNC signals supplied to controller 18. The HSYNC signals indicate to controller 18 that light beam 64 has crossed the location of light intensity sensors 50, 51 in scan direction 68, thus allowing controller 18 to synchronize the timing of image data to laser source 40 with respect to the oscillatory scanning of MEMS device 60 in scanning unit 44.

The present inventors have discovered problems associated with mounting a MEMS device, for example, induced strain, as well as distortion of the MEMS device itself, for example, due to mounting or thermal expansion, which, in the case of a torsion oscillator, induces off-axis motion which may result in poor performance of the torsion oscillator, as well as the overstressing of the torsion oscillator's torsion arms.

Torsion oscillators are particularly sensitive to the externally induced strain that occurs in typical mounting systems. This induced strain generally causes stresses in the torsion oscillator that adversely affect its reliability. In addition, control of the torsion oscillator is based on having only a single axis of rotation. The induced stresses can adversely affect torsion oscillator scanning operation by inducing off-axis motion that distorts the laser scan, i.e., the scanning by laser source 40 of light beam 64 across photoconductive element 52. Also, the off-axis motion generates additional dynamic stresses in the torsion arms of the torsion oscillator, leading to an overstressed condition that may cause premature failure of the torsion oscillator.

Because of the accuracy required in outputting an image with state-of-the-art quality, the oscillatory motion of MEMS device is preferably a stable oscillatory rotation about one axis. Because of the sensitive nature of MEMS device 60, it is preferable to avoid inducing any strain into MEMS device 60 during or after its installation into print engine 20, while at the same time maintaining alignment of MEMS device 60 in print engine 20.

The present inventors discovered solutions to these and other problems associated with mounting a MEMS device, which will become apparent to those skilled in the art as illustrated by the following discussion of the present invention.

Referring again to FIG. 3, module 62 is accordingly configured to retain MEMS device 60 in a secure and stable manner in print engine 20 of imaging apparatus 12, while inducing a minimum of strain in MEMS device 60. Module 62 thus includes a base 72, a bracket 74 to which MEMS device 60 is attached, and a damper 76.

Base 72 includes a first support 78 and a second support 80. Although first support 78 and second support 80 are depicted as being separate supports, it is alternatively contemplated that first support 78 and second support 80 may be integral. Second support 80 includes a support guide feature 82. Base 72 may be integral with scanning unit 44, or may be affixed thereto.

Bracket 74 includes a first end 84 and a second end 86 spaced along a central axis 88. Second end 86 includes a bracket guide feature 90.

First end 84 of bracket 74 is affixed to first support 78 of base 72, for example, using a fastener such as screw 92, to form a cantilever arrangement 94. Support guide feature 82 engages bracket guide feature 90 to form a sliding joint 96 having a sliding axis 98 substantially parallel to central axis 88, thus allowing bracket 74 to expand or contract, e.g., in response to ambient thermal conditions, along sliding axis 98. Sliding joint 96 is configured to restrain second end 86 of bracket 74 in a first direction, e.g., a bi-directional Y-axis direction 100 that is substantially perpendicular to central axis 88 of bracket 74, while allowing freedom of movement of second end 86 of bracket 74 in a second direction perpendicular to central axis 88, for example, a bi-directional Z-axis direction 102.

Figure 4:
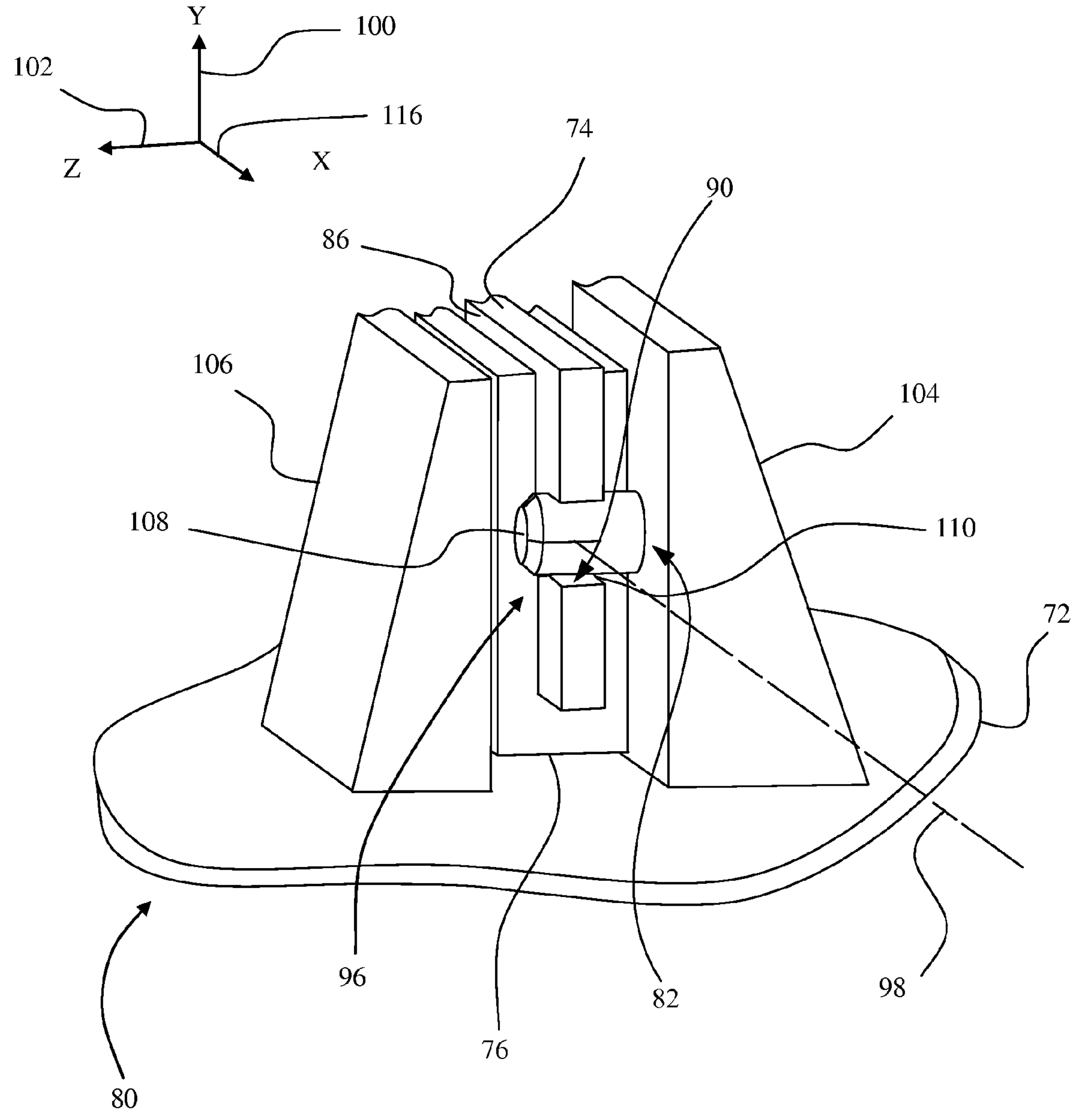
FIG. 4 is a perspective view of the right-hand portion of the module of FIG. 3, with portions removed for clarity.

Referring now to FIG. 4, second support 80 includes a first arm 104 and a second arm 106. Second end 86 of bracket 74 is spaced apart from second support 80 of base 72 in the second direction, i.e., spaced apart from both first arm 104 and second arm 106 of second support 80 in Z-axis direction 102, which thereby cantilevers bracket 74 in Z-axis direction 102.

Damper 76 is interposed between bracket 74 and base 72, i.e., between first arm 104 and second end of bracket 74, and between second arm 106 and second end of bracket 74. Damper 76 damps any vibration of bracket 74 in the second direction, Z-axis direction 102. In the embodiment shown, damper 76 damper is an energy absorbing rubber material, for example, an energy absorbing rubber foam, that is wrapped around second end 86 of bracket 74 at assembly of bracket 74 to base 72. Alternatively, it is contemplated that damper 76 is in the form of two separate pieces that are attached on either side of bracket 74, for example, using a self-adhesive coating on one or both of bracket 74 and damper 76. In either case, the thickness and volume of damper 76 is preferably the same on either side of bracket 74, for example, to prevent asymmetric loading of bracket 74 or displacement of bracket 74 due to thermal expansion and/or aging of damper 76 energy absorbing rubber foam material. Damper 76 preferably has a low compression set, and returns essentially to its original thickness after installation. In order to damp vibration, damper 76 preferably exhibits a high damping characteristic.

Referring again to FIG. 3, sliding joint 96 is characterized by a lug, for example, in the form of a pin 108, and a slot 110, wherein support guide feature 82 takes the form a lug, e.g., pin 108, extending from second support 80 of base 72, and bracket guide feature 90 takes the form of slot 110, which receives the lug to thereby form sliding joint 96. Alternatively, however, it is contemplated that bracket guide feature 90 may be in the form of a lug, e.g., pin 108, extending from second end 86 of bracket 74, and support guide feature 82 may be in the form of slot 110 receiving the lug to thereby forming sliding joint 96. Although pin 108 is depicted as extending from first arm 104 of second support 80 of base 72, it is contemplated that, alternatively, pin 108 may extend from second arm 106 of second support 80.

Figure 5:
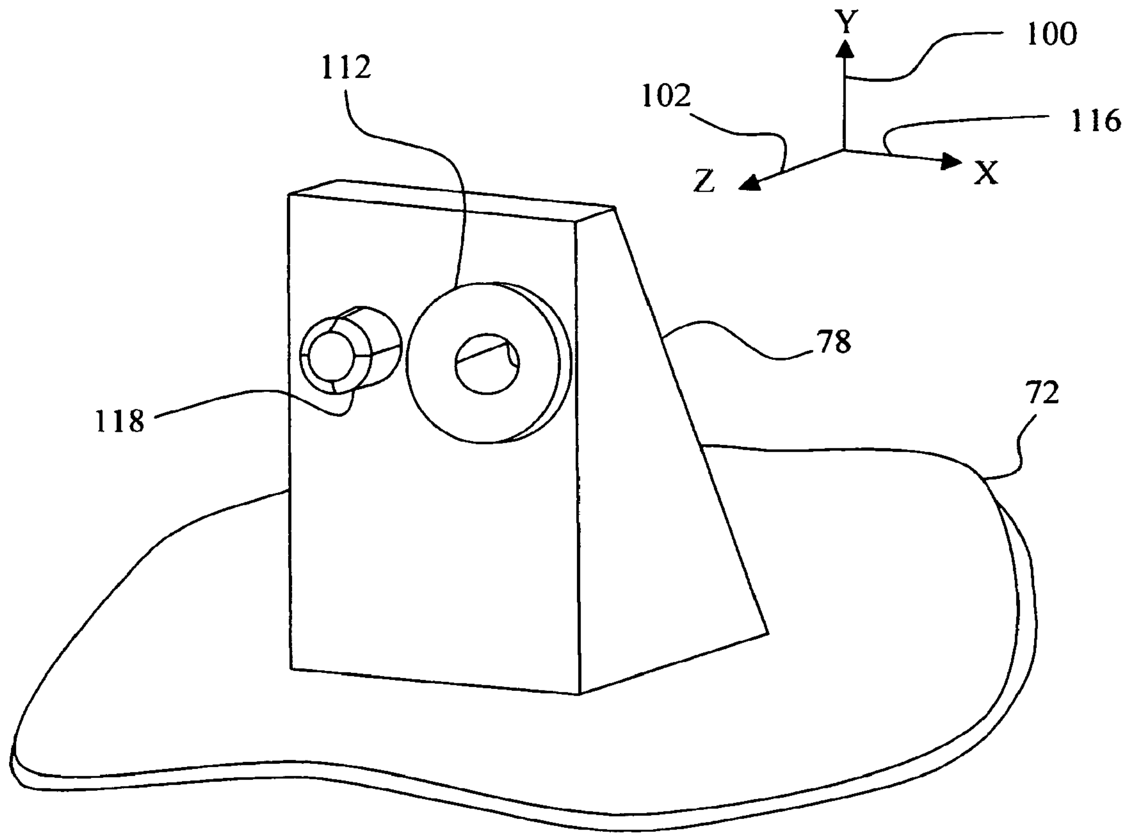
FIG. 5 is a perspective view of a first support of the module of FIG. 3.

Referring now to FIG. 5, in order to accurately position in translation first end 84 of bracket 74 with respect to base 72 in three mutually orthogonal axes, a datum pad 112 and a pin joint 114 are employed by the present invention.

Datum pad 112 is interposed between first end 84 and first support 78 of base 72. Datum pad 112 positions bracket 74 relative to base 72 in the second direction, Z-axis direction 102. For example, datum pad 112 is depicted in FIG. 5, whereas bracket 74 is not shown for purposes of clarity. Although depicted as extending from first support 78, it will be recognized by those skilled in the art that datum pad may alternatively be integral or flush with first end 84 of bracket 74 and/or first support 78 of base 72, or may be a separate subcomponent of module 62 that is installed between first end 84 and first support 78. In either case, the fastener, screw 92 fastens first end 84 to first support 78, passing through datum pad 112 to secure first end 84 of bracket 74 to first support 78 of base 72 with little or no deflection of bracket 74 as would upset the alignment of MEMS device 60, and with little or no strain induced into bracket 74 that would adversely affect the reliability or robustness of MEMS device 60.

Pin joint 114 couples first end 84 of bracket 74 to first support 78 of base 72, positioning first end 84 of bracket 74 relative to base 72 in the first direction, Y-axis direction 100, and in a third direction, e.g., X-axis direction 116, that is orthogonal to Y-axis direction 100 and the second direction, Z-axis direction 102.

Referring now to FIGS. 3 and 5, pin joint 114 is characterized by a pin and a socket. Thus, first support 78 of base 72 includes a pin 118 protruding therefrom, and first end 84 of bracket 74 includes a socket 120 receiving pin 118, thereby forming pin joint 114. Alternatively, however, it is contemplated that first end 84 of bracket 74 may include pin 118 protruding therefrom, and that first support 78 of base 72 may correspondingly include socket 120 receiving pin 118 to thereby form pin joint 114. In the present embodiment, socket 120 is in the form of a hole that has a close fit with pin 118.

The hole may be circular, providing surface-to-surface contact with pin 118, polygonal, providing line-to-line contact with pin 118, or a combination thereof.

Figure 6:
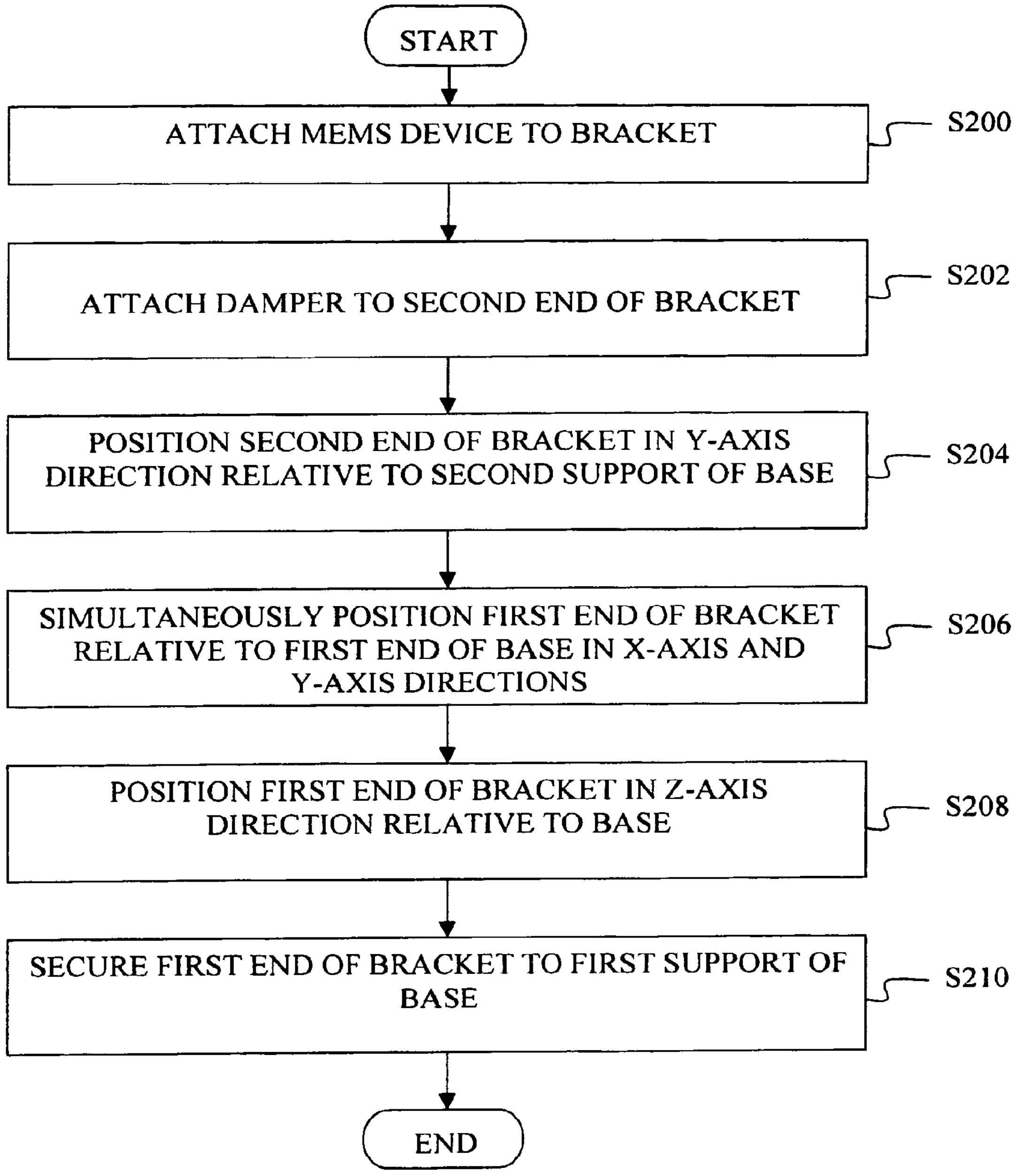
FIG. 6 is a flowchart generally depicting a method for mounting a MEMS device in accordance with the present invention.

Referring now to FIG. 6, a method for mounting a MEMS device 60 to base 72 is depicted.

At step S200, MEMS device 60 is attached to bracket 74.

At step S202, damper 76 is attached to second end 86 of bracket 74. Alternatively, however, it is contemplated that damper 76 may be attached to second support 80 of base 72.

At step S204, second end 86 of bracket 74 is positioned in Y-axis direction 100 relative to second support 80 of base 72. This positioning includes restraining second end 86 of bracket 74 only in Y-axis direction 100, for example by engaging pin 108 of second support 80 with slot 110 of second end 86.

At step S206, first end 84 of bracket 74 is simultaneously positioned in both Y-axis direction 100 and X-axis direction 116 orthogonal to Y-axis direction 100 relative to first support 78 of base 72. This simultaneous positioning includes restraining first end 84 of bracket 74 in both X-axis direction 116 and Y-axis direction 100 using pin joint 114, for example, by engaging pin 118 of base 72 with socket 120 of first end 84 of bracket 74.

At step S208, first end 84 of bracket 74 is positioned in Z-axis direction 102 orthogonal to both X-axis direction 116 and Y-axis direction 100 relative to base 72, wherein second end 86 of bracket 74 is spaced apart from second support 80 in Z-axis direction 102, thereby cantilevering bracket 74 as described above.

At step S210, first end 84 of bracket 74 is secured to first support 78 of base 72 using screw 92, after which point MEMS device 60 has been mounted to base 72.

Although the above steps S200-S210 are depicted and discussed as flowing linearly from S200 to S210, such portrayal is not to be construed as limiting the scope of the present invention or limiting the order in which the steps of the present invention are performed. Rather such depiction is provided as an exemplary flow of the present invention method intended for the convenience of the reader in understanding the present invention.

From the above description, it should be clear to those skilled in the art that the present inventors, by discovering the present invention, have solved some of the problems associated with mounting a MEMS device.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A controller executing instructions to form a latent image; a print engine including a laser source, a micro-electromechanical system (MEMS) device, and a module for mounting said MEMS device, said print engine communicatively coupled to said controller and configured to form said latent image using said laser source and said MEMS device in response to said instructions, and said module including: a base having a first support and a second support, said second support having a support guide feature; and a bracket attached to said MEMS device, said bracket having a central axis, a first end, and a second end, said second end having a bracket guide feature, said first end being affixed to said first support of said base to form a cantilever arrangement, said support guide feature engaging said bracket guide feature to form a sliding joint having a sliding axis substantially parallel to said central axis, wherein said sliding joint is configured to restrain said second end of said bracket in a first direction substantially perpendicular to said central axis of said bracket while allowing freedom of movement of said second end of said bracket in a second direction perpendicular to said central axis, said second end of said bracket being spaced apart from said second support of said base in said second direction to thereby cantilever said bracket in said second direction.

2. The imaging apparatus of claim 1, further comprising a damper interposed between said bracket and said base.

3. The imaging apparatus of claim 2, wherein said damper is interposed between said second end of said bracket and said second support of said base.

4. The imaging apparatus of claim 2, wherein said damper damps a vibration of said bracket in said second direction.

5. The imaging apparatus of claim 2, wherein said damper is an energy absorbing rubber.

6. The imaging apparatus of claim 2, further comprising a datum pad interposed between said first end of said bracket and said first support of said base, said datum pad positioning said bracket relative to said base in said second direction.

7. The imaging apparatus of claim 6, further comprising a pin joint coupling said first end of said bracket to said first support of said base, said pin joint positioning said first end of said bracket relative to said base in said first direction and in a third direction orthogonal to said first direction and said second direction.

8. The imaging apparatus of claim 7, wherein said first direction is a Y-axis direction, said second direction is a Z-axis direction, and said third direction is an X-axis direction, each of said Y-axis direction, said Z-axis direction, and said X-axis direction being mutually orthogonal.

9. The imaging apparatus of claim 7, wherein said first support of said base includes a pin protruding therefrom, and wherein said first end of said bracket includes a socket receiving said pin, thereby forming said pin joint.

10. The imaging apparatus of claim 7, wherein said first end of said bracket includes a pin protruding therefrom, and wherein said first support of said base includes a socket receiving said pin, thereby forming said pin joint.

11. The imaging apparatus of claim 7, wherein said support guide feature is a lug extending from second support of said base, and said bracket guide feature is a slot receiving said lug, thereby forming said sliding joint.

12. The imaging apparatus of claim 11, wherein said lug is a pin.

13. The imaging apparatus of claim 7, wherein said bracket guide feature is a lug extending from said second end of said bracket, and said support guide feature is a slot receiving said lug, thereby forming said sliding joint.

14. The imaging apparatus of claim 13, wherein said lug is a pin.

15. The imaging apparatus of claim 6, further comprising a fastener passing through said datum pad and securing said first end of said bracket to said first support of said base.

16. The imaging apparatus of claim 1, wherein said MEMS device is a torsion oscillator.

* * * * *